United States Patent
Sun et al.

(10) Patent No.: US 9,900,161 B2
(45) Date of Patent: Feb. 20, 2018

(54) METHOD FOR CERTIFYING ANDROID CLIENT APPLICATION BY LOCAL SERVICE UNIT

(71) Applicant: BEIJING SENSELOCK SOFTWARE TECHNOLOGY CO., LTD., Beijing (CN)

(72) Inventors: Jiping Sun, Beijing (CN); Yong Han, Beijing (CN)

(73) Assignee: BEIJING SENSESHIELD TECHNOLOGY CO., LTD, Haidian District (CN)

( * ) Notice: Subject to any disclaimer, the term of this patent is extended or adjusted under 35 U.S.C. 154(b) by 5 days.

(21) Appl. No.: 14/760,253

(22) PCT Filed: Sep. 17, 2013

(86) PCT No.: PCT/CN2013/083666
§ 371 (c)(1),
(2) Date: Jul. 10, 2015

(87) PCT Pub. No.: WO2014/044170
PCT Pub. Date: Mar. 27, 2014

(65) Prior Publication Data
US 2016/0277194 A1  Sep. 22, 2016

(30) Foreign Application Priority Data

Sep. 18, 2012 (CN) .......................... 2012 1 0344786

(51) Int. Cl.
*H04L 29/06* (2006.01)
*H04L 9/32* (2006.01)
(Continued)

(52) U.S. Cl.
CPC ............ *H04L 9/3263* (2013.01); *G06F 21/51* (2013.01); *H04L 9/0618* (2013.01); *H04L 9/14* (2013.01);
(Continued)

(58) Field of Classification Search
CPC .......... H04L 9/3263; H04L 9/14; H04L 9/30; H04L 9/0618; H04L 9/0861;
(Continued)

(56) References Cited

U.S. PATENT DOCUMENTS 9,137,017 B2 * 9/2015 Fu .......................... H04L 9/0894
2005/0160292 A1 * 7/2005 Batthish ................ H04L 63/045
726/5

(Continued)

FOREIGN PATENT DOCUMENTS

| CN | 1635811 A | 7/2005 |
| CN | 1866870 | 2/2006 |

(Continued)

OTHER PUBLICATIONS

International Search Report for corresponding patent application No. PCT/CN2013/083666 dated Dec. 19, 2013.

(Continued)

*Primary Examiner* — Mohammad A Siddiqi
(74) *Attorney, Agent, or Firm* — Renner, Otto, Boisselle & Skylar, LLP; Grant Steyer (57) ABSTRACT

The present invention provides a method for certifying an Android client application by a local service program. In the method, a client application is signed to generate a certification information file; when the client application is run in an Android system, the certification information file is certified by a local service program, and the client application can normally use services provided by the local service program as long as the certification is successful. By the (Continued)

method provided by the present invention, a tampered client application is unable to acquire functions of a local service program, so that legitimate software is distinguished from malicious software, and the security of both the Android system and the network is ensured.

8 Claims, 4 Drawing Sheets

(51) Int. Cl.
    *H04L 9/06*     (2006.01)
    *H04L 9/30*     (2006.01)
    *H04L 9/14*     (2006.01)
    *G06F 21/51*     (2013.01)
    *H04W 12/12*     (2009.01)

(52) U.S. Cl.
    CPC .............. *H04L 9/30* (2013.01); *H04L 9/3239* (2013.01); *H04L 9/3247* (2013.01); *H04W 12/12* (2013.01)

(58) Field of Classification Search
    CPC . H04L 63/0823; H04L 63/06; H04L 2209/80; H04W 12/06; H04W 12/04
    See application file for complete search history.

(56) References Cited

U.S. PATENT DOCUMENTS

2006/0059346 A1* 3/2006 Sherman ............ H04L 63/0823
    713/175
2009/0055817 A1* 2/2009 Maj ........................... G06F 8/65
    717/173
2011/0029779 A1 2/2011 Sekiya et al.
2012/0240236 A1* 9/2012 Wyatt .................... G06F 21/564
    726/25
2013/0151292 A1* 6/2013 Van Deloo ............. G06Q 10/02
    705/5
2013/0232540 A1* 9/2013 Saidi .................... G06F 21/6218
    726/1
2014/0230012 A1* 8/2014 Ahn ......................... G06F 21/53
    726/1
2015/0033320 A1* 1/2015 Liang ..................... G06F 21/50
    726/11

FOREIGN PATENT DOCUMENTS

| CN | 101266638 | 4/2008 |
| CN | 102034059 A | 4/2011 |
| CN | 102300065 A | 12/2011 |
| CN | 102891843 A | 1/2013 |

OTHER PUBLICATIONS

Written Opinion for corresponding patent application No. PCT/CN2013/083666 dated Dec. 19, 2013.
International Preliminary Report on Patentability for corresponding patent application No. PCT/CN2013/083666 dated Mar. 24, 2015.
Office Action for corresponding Chinese Application No. 201210344786.X, dated Sep. 2, 2014.
Office Action for corresponding Chinese Application No. 201210344786.X, dated Oct. 20, 2014.

* cited by examiner

METHOD FOR CERTIFYING ANDROID CLIENT APPLICATION BY LOCAL SERVICE UNIT

This application is a national phase of International Application No. PCT/CN2013/083666 filed Sep. 17, 2013.

TECHNICAL FIELD

The present invention relates to the field of the security protection of applications in an Android system, in particular to a method for verifying an Android client application by a local service unit.

BACKGROUND OF THE PRESENT INVENTION

In an Android system, to avoid rampant pirated software, Google has developed an Android signature mechanism. The Android signature mechanism indicates an issuer of an Android client application. It is judged, by comparing the signature of a client application, whether a client application is "officially" issued or is "pirated software" which is tampered, re-signed and packaged by a cracker.

The Android system requires that each application installed into the system is signed by a digital certificate, and the private key of the digital certificate is stored by a program developer. In the Android system, the digital certificate is used for identifying an author of an application and establishing a trust relationship between applications, and not used for determining which applications may be installed by an end user. This digital certificate is not required to be certified by an authoritative digital certificate signature mechanism, and is merely used for allowing an application package to realize self-certification.

A client application package signed by an Android signature tool additionally contains a folder of META-INF containing encryption information, and other files would not be changed. Thus, the original signature information may be easily removed, the application package is cracked, and the code is tampered to generate malicious software which is re-signed. As a result, the interest of a developer is damaged, and even the security of both a mobile phone and a network is threatened.

To further safeguard the copyright interest of developers, prevent rampant pirated software and protect the security of applications in an Android system, developers have made some improvements to increase the difficulty of decompiling of an application package of an Android client. At present, a solution intended to solve pirated applications in an Android system has been proposed. The solution is as follows: a service provider provides a local service unit (e.g., a local service program), and the local service program, serving as a native service, is simultaneously launched together with the Android system and then run always in the background; the local service program provides functions such as memory encryption, file encryption, and remote call of a function on a cloud server side; and the Android client application calls an interface provided by the local service program to perform encryption transformation to a key value (e.g., a gold coin value in an application like a game), a key file, a key code and the like via the local service program. When a client application is running, according to the calling requirements of the client application, the encrypted object is decrypted in real time by the local service program. In this way, it is difficult to perform decompiling and static analysis to the client application, and the effective protection to an application in the Android system is thus realized.

During this process, the key value and key code of the client application are stored in a cloud server side via the local service program. When the client application stores or acquires a key value or the like to or from the cloud server side, it is required to call a remote (cloud server side) calling interface of the local service program, and then perform communication to the cloud server side by the local service program. The local service program serves as a transfer station between the client application and the cloud server side and plays a role of a bridge connecting the two sides.

However, if some malicious client applications use an existing local service program to continuously perform malicious operations to the cloud server side (for example, continuously store gold coins to the cloud server side or acquire some key values) to gain benefits, the local service program is unable to distinguish whether those client applications are client applications downloaded through a formal channel or malicious client applications compiled by a user himself. Therefore, there is such a demand of providing a method which can judge whether an Android client application is replaced, in order to stop the execution of a malicious client application in time, and to prevent the application codes of the client application from being maliciously tampered.

SUMMARY OF THE PRESENT INVENTION

To prevent malicious software in an Android system from changing data in a cloud server side by using a local service program to gain benefits, the present invention provides a method for certifying a client application by a local service program, including the following steps of:

step 1: encrypting a client application package of the application by an encryption algorithm to generate a certification information file, where the client application package corresponds to the certification information file;

step 2: running a local service unit in the background of the Android system;

step 3: establishing binder communication between the application and the local service unit;

step 4: searching, by the local service unit, the client application package according to information sent by the application;

step 5: executing step 6 if the client application package is successfully searched; otherwise, breaking off the binder communication between the local service unit and the application;

step 6: reading, by the local service unit, the certification information file;

step 7: certifying, by the local service unit, the certification information file; and step 8: normally running the application if the certification is successful; otherwise, breaking off the binder communication between the local service unit and the application.

According to one aspect of the present invention, in step 1, the certification information file is stored in the client application package, or stored in a remote cloud server side.

According to one aspect of the present invention, in step 4, the local service unit searches the corresponding client application package according to a user ID and a process ID sent by the application.

According to one aspect of the present invention, in step 4, the client application package is an APK package.

According to one aspect of the present invention, in step 6, if the certification information file is not read, the local service unit searches the certification information file from a remote cloud server side; and, if the certification information file is not searched from the remote cloud server side, the binder communication between the local service unit and the application is broken off.

According to one aspect of the present invention, if the certification information file is searched and the certification information file contains a cipher text and an encryption algorithm, in step 7, a corresponding certification method is selected according to the type of the encryption algorithm so as to certify the cipher text in the certification information file.

According to one aspect of the present invention, if one-way encryption algorithm is employed, the local service unit encrypts the client application package according to the encryption algorithm to generate a cipher text, and then certify the generated cipher text and the cipher text in the certification information file; and if a two-way encryption algorithm is employed, the local service unit acquires a key to decrypt the cipher text in the certification information file.

According to one aspect of the present invention, if a two-way encryption algorithm is employed, a key of the two-way encryption algorithm is stored in the package in the local service unit, or stored in a cloud server side.

According to one aspect of the present invention, in step 8, after the certification is successful, the application is run normally, and the application is allowed to call services provided by the local service unit.

DETAILED DESCRIPTION OF THE PRESENT INVENTION

To prevent a malicious application in an Android system from changing data of a cloud server side by using a local service unit (hereafter referred to as a local service program), the present invention provides a method for certifying a client application by a local service program.

The method certifying a client application by a local service program is described as below.

A client application package is encrypted by an encryption algorithm to generate a certification information file, where the client application package corresponds to one certification information file. According to one embodiment of the present invention, the storage position of the certification information file is determined by a developer. The certification information file may be stored in the client application package, or stored in a remote cloud server.

A client application is launched.

Binder communication between the local service program and the client application is established.

After the binder communication between local service program and the client application is established, the local service program searches the corresponding client application package according to a user ID and a progress ID of the client application. For example, the client application package is a common APK package in the Android system.

If the client application package is not searched, the local service program breaks off the binder communication with the client application, so that the client application cannot acquire services provided by the local service program.

If the client application package is searched, the certification information file in the client application package is read by the local service program.

If the certification information file is not read, there are following two possibilities: one possibility is that the client application package is incomplete, and another possibility is that different encryption algorithms for generating the verification information file result in a different storage position of the certification information file. In other words, the certification information file of the client application may be stored in the cloud server side. Then, the local service program searches the certification information file from the cloud server side. If the certification information file is not successfully searched from the cloud server side, the client application package is really incomplete or illegal such that the local service program breaks off the binder communication with the client application and does not provide services such as an encryption function to the client application. If the local service program searches the certification information file from the cloud server side and the certification information file contains a cipher text and an encryption algorithm, according to one embodiment of the present invention, the local service program encrypts the client application package according to the encryption algorithm to generate a cipher text and then compares the generated cipher text with the cipher text in the certification information file for certification. Additionally, according to one embodiment of the present invention, in addition to the processing mode of the above one-way encryption algorithm, the following processing mode may also be used: the type of the encryption algorithm is judged; if the encryption algorithm is a one-way encryption algorithm, the local service program encrypts the client application package according to the encryption algorithm to generate a cipher text and then compares the generated cipher text with the cipher text in the certification information file for certification; and, if the encryption algorithm is a two-way encryption algorithm, the cipher text of the client application is decrypted (certified) by a key acquired by the local service program.

If the certification is not successful, the local service program breaks off the binder communication with the client application and does not provide services to the client application. If the certification is successful, the client application is executed normally.

Figure 1:
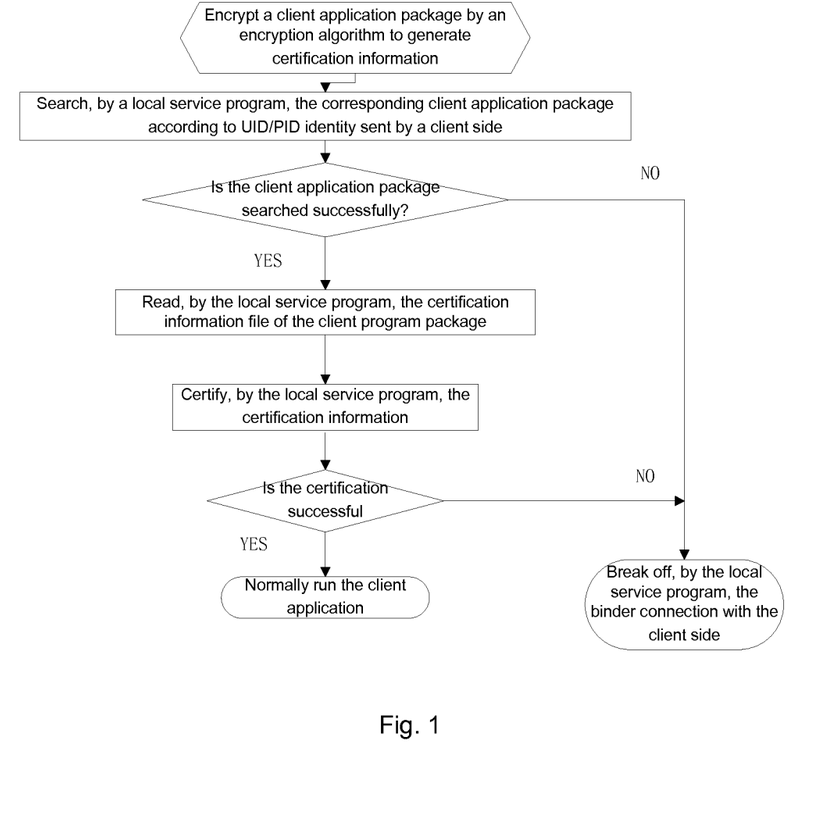
FIG. 1 is a flowchart of the present invention.

FIG. 1 shows most of the processing flow.

The certification information file corresponding to the client application package refers to a cipher text generated by encrypting the client application package through an encryption algorithm. The storage position of the certification information file is different due to different encryption algorithms. The certification file may be stored in the client application package, or stored in a cloud server side, depending upon the characteristics of the used encryption algorithm. According to different storage positions of the certification information file, the corresponding method for certifying a client application by a local service program is also different. As required, in addition to the cipher text, the certification information file may include other information, such as an encryption algorithm or a storage position of a key.

The encryption algorithm is generally classified into two-way encryption and one-way encryption. The one-way encryption strictly is a digest algorithm and is irreversible encryption, for example, an MD5 algorithm, and functions as converting information of arbitrary length into a hexadecimal digit string (called "digest information") of a certain length and meanwhile ensuring digest information of different information to differ from one another. With respect to the one-way encryption algorithm, the certification information file includes a cipher text, i.e., digest information, and the encryption algorithm is MD5 or other information. According to the characteristics of the one-way encryption, the certification information file may be stored in the cloud server side, and the local service program downloads the certification information file from the cloud server side after the client application is connected to the local service program. Then, the local service program encrypts the client application package again according to the encryption algorithm in the certification information file to generate a cipher text and then compares this cipher text with the cipher text of the certification information file downloaded from the cloud server side, so as to judge whether the client application is legal.

According to one embodiment of the present invention, the certification information file of the one-way encryption may also be stored in the client application package. Then, after the client application is connected to the local service program, the local service program encrypts the client application package again according to the encryption algorithm in the certification information file to generate a cipher text and then compares this cipher text with the cipher text of the certification information file in the client application package, so as to judge whether the client application is legal.

The two-way encryption algorithm is classified into symmetric encryption and asymmetric encryption. Taking the asymmetric encryption as example, according to a pair of public key and private key, the client application is encrypted by the private key to form a cipher test, so the certification information file of the client application includes information about a cipher text, a storage position of the public key and the like, where the storage position of the public key may be in the local service program package or on a cloud server side. The local service program acquires the public key according to the information about the storage position of the public key in the in certification information file, and certifies the cipher text of the certification information file of the client application according to the acquired public key.

The local service program serves as a native service in the Android system, and is simultaneously launched together with the Android system and then runs in the background to provide services. The local service program provides a service for certifying whether a client application is legal, and meanwhile may provide function modules such as memory encryption, file encryption or remote (cloud server side) function calling. On one hand, the local service program provides a local encryption service; on the other hand, the local service program serves as a transfer station between the client application and the cloud server side to perform data interaction with the cloud server side.

The interaction between the local service program and the client application is a Client-Server communication mode based on binder. The binder is one of inter-process communication (IPC) modes in the Android system.

Introduction of binder communication: the binder communication is a Client-Server communication structure: first, superficially, the binder communication is that a client acquires a proxy interface of a server and directly calls the server; second, methods defined in the proxy interface are actually in one-to-one correspondence to methods defined in the server; third, when the client calls a method in a certain proxy interface, the method in the proxy interface will package parameters transferred by the client into a Parcel object; fourth, the proxy interface sends the Parcel to a binderdriver in a kernel; fifth, the server will read request data in the binderdriver; if the request data is sent to the server itself, the server unpacks and processes the Parcel object and returns a result; sixth, the whole calling process is a synchronous process, and the client will be blocked when the server is processing.

The Android system allocates a UID to each installed APK, so the UID is an important symbol for identifying an application. In the Android system, each different program has a unique UID, while an application may have a plurality of PIDs, so the binder realizes the isolation of a process from data by the UID/PID carried by a communication itself. The binder is a Client-Server communication mode. During transmission, a UID/PID allocated by the Android system is added to the information sent by the Client side, so the Server side may identify the identity of the Client side according to the UID/PID from the sender, thereby ensuring high security. In the Android system, the local service program is used as a Server side of the binder, while the client application is used as a Client side of the binder.

Introduction of ServiceManager: the ServiceManager is a Linux-level process and is a manager of services. Any service will be registered to the SM (ServiceManager) before use; meanwhile, when a client needs to access to a certain service, the client should first inquire the existence of the service from the SM. If this service exists in the SM, the handle of the service will be returned to the client, where the handle is a unique identifier of each service.

Similar to DNS, the ServiceManager functions as converting a binder name in form of characters into a quote of this binder in the Client, so that the Client can acquires the quote of a binder entity in the Server through the binder name. A binder registered with a name is called a real-name binder. For example, each website has its own URL in addition to an IP address. The Server establishes binder entities, then gives each binder entity a readable and catchy name in form of characters, sends the binder together with the name to the ServiceManager in form of a data package through a binder driver, and informs the ServiceManager that a binder named Zhangsan is registered and located in a certain Server. The driver establishes, for this binder passing through a process boundary, an entity node located in the kernel and a quote of the ServiceManager to the entity, and packages the name and the newly established quote and then transfers them to the ServiceManager. Upon receiving the data package, the ServiceManager fetches the name and the quote and then fills them into a lookup table.

The ServiceManager manages service processes, and the local service program first registers a name to the ServiceManager and then becomes a real-name binder. For example, a binder named Zhangsan corresponds to a quote of the local service program. As the Client side of the local service program, the client application searches the corresponding quote of the binder named Zhangsan through the ServiceManager. This quote is a binder quote of the local service program. The client application sends a request to the local service program through the binder quote returned by the ServiceManager.

After connection between the both is established, communication is started. The local service program identifies the identity of the client application according to a user ID and a process ID (UID/PID) of the client application carried by the binder in the Android system, and thus realizes functions, such as inter-process data isolation or certifying whether the client application is legal.

In conclusion, the present invention effectively avoids the damage resulted from the malicious tampering of application data by an illegal client application.

To make the objectives, technical solutions and advantages of the present invention clearer, the present invention will be further described as below in details with reference to the accompanying drawings by specific embodiments. It should be understood by those skilled in the art that the following embodiments are merely provided for realizing specific implementations of the present invention and not intended to specifically limit the present invention. Those skilled in the art completely may make various improvements and displacements according to the technical teaching of the following specific embodiments, without departing from the scope of the present invention.

Embodiment 1

In this embodiment, the encryption algorithm for generating a certification information file of a client program package is an asymmetric encryption algorithm in the two-way encryption algorithm. A class.dex file in an Android client program package APK is encrypted by an RSA private key in this embodiment. The generated certification information file is stored in the client application package or a cloud server side.

Figure 2:
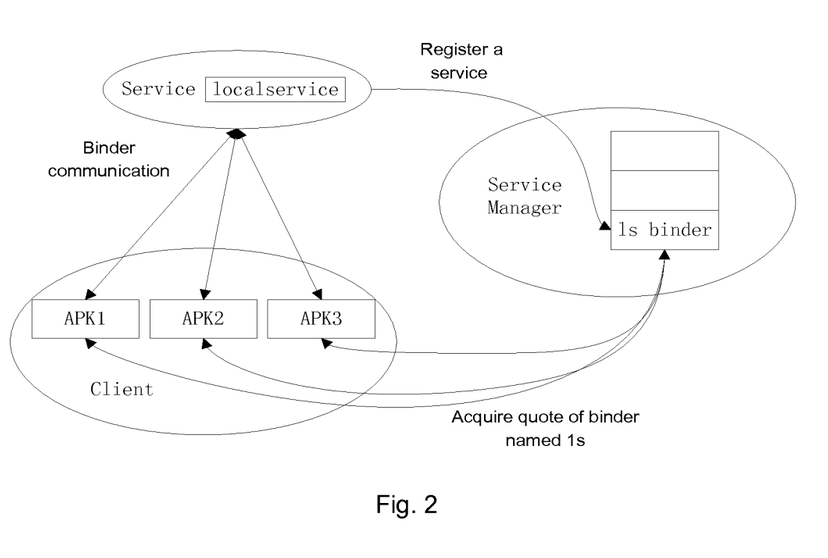
FIG. 2 is a schematic diagram of a process of establishing binder communication between a local service program and a client application according to the present invention.

FIG. 2 shows a process of establishing binder communication between a local service program and a client application. After installed, the local service program is launched together with the Android system and then runs always in the background to provide functions such as memory encryption, file encryption and remote (cloud server side) function calling.

If a client application wants to acquire services provided by the local service program, binder communication between the client application and the local service program needs to be established first. In FIG. 2, mainly three modules, i.e., ServiceManager, Service and Client, are included. The ServiceManager is used for managing the Service, and the Service is used for managing the Client. According to a specific implementation of the present invention, the local service program corresponds to the Service module, while the client application corresponds to the Client module.

The local service program first registers a service to the ServiceManager, for example, a binder named 1s. The ServiceManager manages a table in which a quote of the binder named 1s is maintained.

The client application is launched to send a request to the ServiceManager to acquire the quote of the local service program binder.

The Client side requests to the ServiceManager to access to the quote of the binder named "1s", and the ServiceManager side searches the corresponding quote of the binder named "1s" and sends the quote as a reply to the client application of the requested Client side. So far, the binder communication between the local service program and the client application has been established, and the Android system will automatically add UID and PID information for each binder communication so as to realize data isolation between a user and a process.

Figure 3:
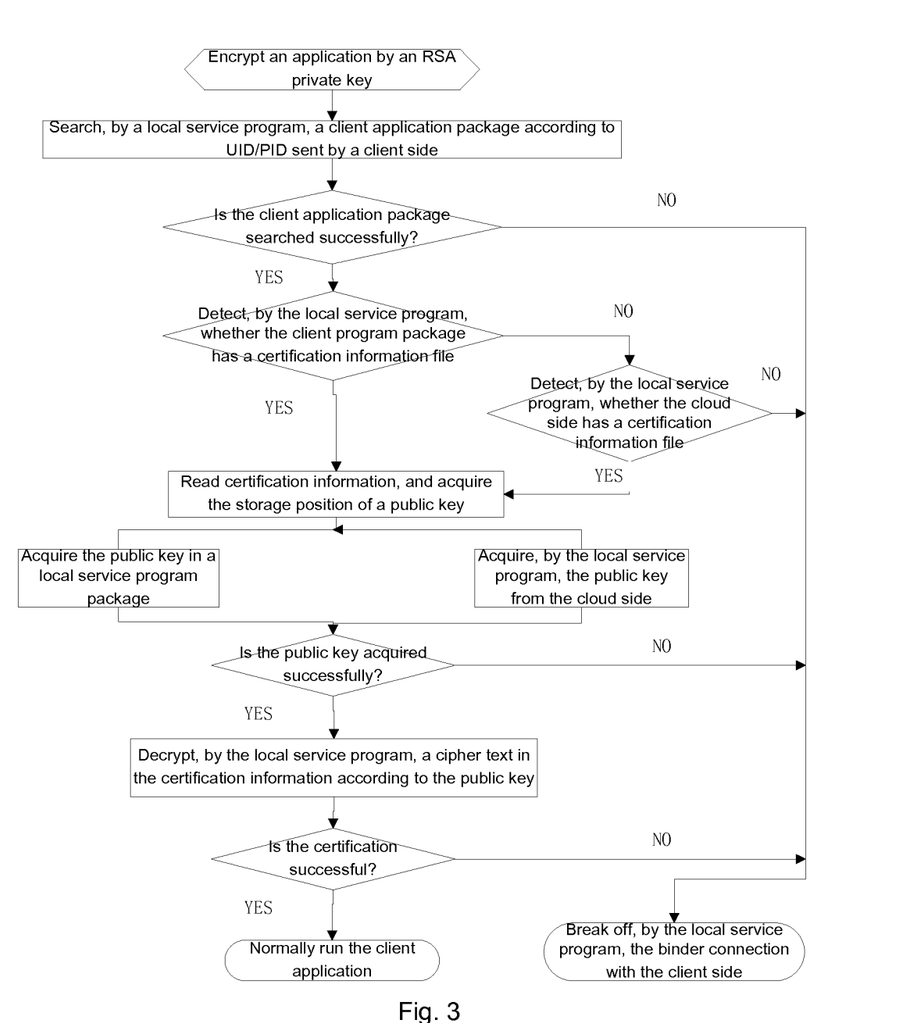
FIG. 3 is a schematic diagram of a process of certifying a client application by a local service program according to Embodiment 1 of the present invention.

FIG. 3 shows a process of certifying a client application by the local service program in this embodiment.

Step 1: A class.dex film in an APK package is encrypted by an RSA private key, and the obtained cipher text is stored in the certification information file, for example, an info.text file. If a public key is stored in the info.text file, the info.text file is the certification information file of the client application. According to one embodiment of the present invention, the certification information file may be stored in the client application package, or stored in a cloud server side.

Step 2: Binder communication is established between the client application and the local service program. The specific process refers to FIG. 2.

Step 3: The local service program searches the corresponding client application package according to UID/PID carried in the information sent by the client application, where an application package in the Android system is generally a package with an APK suffix.

Step 4: If the client application is searched successfully, step 5 will be executed; otherwise, the binder communication between the local service program and the client program is broken off.

Step 5: The local service program begins to detect whether the searched client program package contains a certification information file, which is an info.text file in this embodiment; if so, step 7 will be executed; otherwise, step 6 will be executed.

Step 6: The local service program begins to detect whether there is a certification information file corresponding to the searched client application; if so, step 7 will be executed; otherwise, the binder communication between the local service program and the client program is broken off.

Step 7: The local service program reads the content of the certification information file to acquire the storage position of a public key.

Step 8: If the public key is stored in the cloud server side, step 9 will be executed; if the public key is stored in the local service program package, step 10 will be executed; and, if information about the storage position of the public key is not read, step 11 will be executed.

Step 9: If the public key is stored in the cloud server side, the local service program remotely calls a function to acquire the public key in the cloud server side; if the public key is acquired successfully, step 12 will be executed; otherwise, the binder communication between the local service program and the client application is broken off.

Step 10: If the public key is stored in the local service program, the local service program searches the public key in its own program packages; if the public key is searched successfully, step 12 will be executed; otherwise, the binder communication between the local service program and the client application is broken off.

Step 11: If information about the storage position of the public key is not read in the certification information file, the local service program searches the public key in its own program packages; if the public key is searched successfully, step 12 will be executed; otherwise, the local service program acquires the public key from the cloud server side.

Step 12: The local service program decrypts the cipher text of the certification information file according to the acquired public key; if the certification is successful, the client application may run normally and may call services provided by the local service program; and, if the certification is not successful, it is indicated that the client application is illegal, and the binder communication between the local service program and the client application is broken off.

Embodiment 2

In this embodiment, a client application package is encrypted by MD5 of the one-way encryption algorithm. This algorithm is often used for file verification. No matter how big a file is, a unique MD5 value may be generated after it is processed by MD5.

The certification information file in this embodiment includes an MD5 value and a corresponding one-way encryption algorithm. If a client application changes, the MD5 value generated by the MD5 algorithm varies definitely. The certification to the client application is realized according to this principle.

Figure 4:
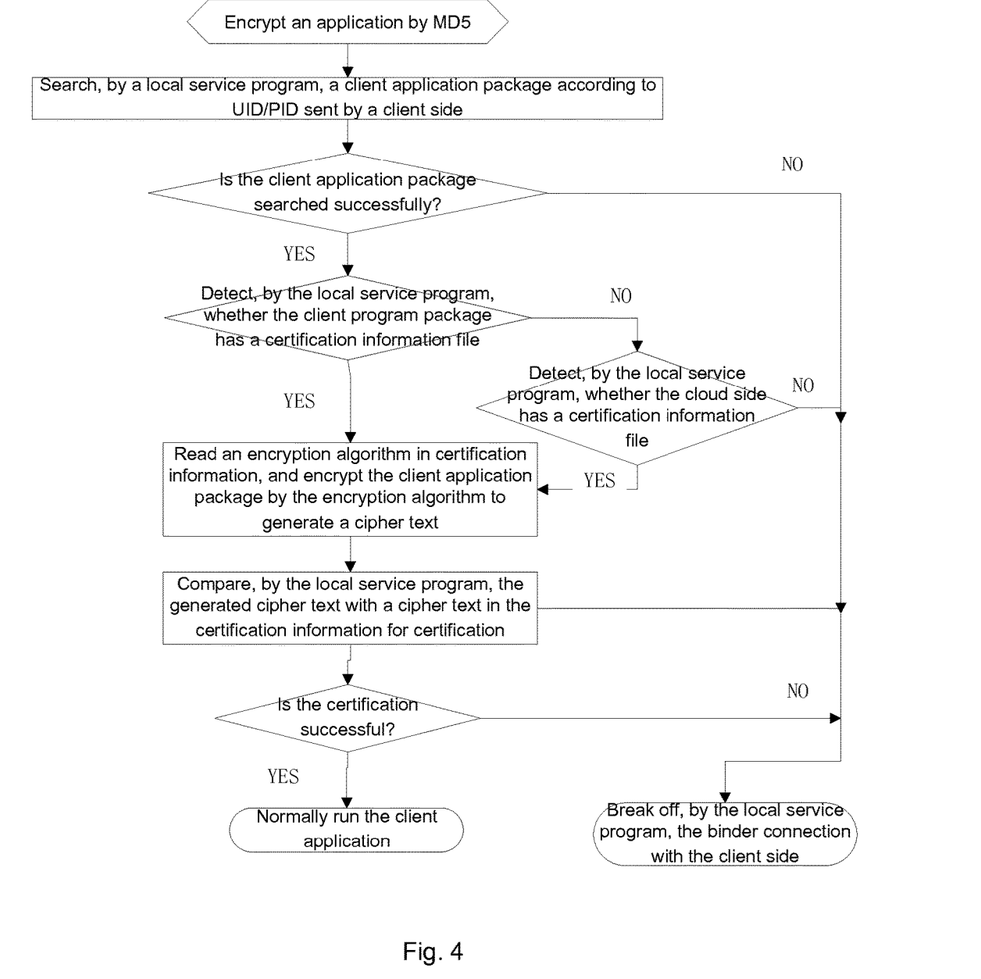
FIG. 4 is a schematic diagram of a process of certifying a client application by a local service program according to Embodiment 2 of the present invention.

FIG. 4 is a flowchart of this embodiment, illustrating a process of certifying a client application by a local service program by a one-way encryption algorithm.

Step 1: A client application package is encrypted by an MD5 algorithm, where a certification information file consisting of the generated MD5 value and the encryption algorithm may be stored in a cloud server side or stored in the client application package.

Step 2: Binder communication is established between a client application and a local service program. The specific process refers to FIG. 2.

Step 3: The local service program searches the corresponding client application package according to UID/PID carried in information sent by the client application, where the application in the Android system is generally a package with an APK suffix.

Step 4: If the client application package is searched successfully, step 5 will be executed; otherwise, the binder communication between the local service program and the client program is broken off.

Step 5: The local service program detects whether the client application package has a certification information file; if so, step 7 will be executed; otherwise, step 6 will be executed.

Step 6: The local service program detects whether the cloud side has a certification information file; if so, step 7 will be executed; otherwise, it is judged that the client application is illegal, and the binder communication between the local service program and the client application is broken off.

Step 7: The local service program reads the encryption algorithm in the certification information file, encrypts the client application package by the encryption algorithm to generate a cipher text, and compares this cipher text with a cipher text in the certification information file for certification; if the certification is successful, step 8 will be executed; otherwise, the binder communication between the local service program and the client application is broken off.

Step 8: After the certification is successful, the client application may run normally and may call services provided by the local service program.

The forgoing description merely shows preferred embodiments of the present invention, and is not intended to limit the protection scope of the present invention. Any modifications, equivalent displacements and improvements made within the spirit and principle of the present invention shall fall into the protection scope of the present invention.

The invention claimed is:

1. A method for preventing a malicious application in an Android system from changing data in a server by using a local service program, the method comprising the following steps of:
    step 1: encrypting a client application package of an application by an encryption algorithm to generate a certification information file, wherein:
        the client application package corresponds to the certification information file;
        the certification information file is stored in the client application package or a remote cloud server; and
        the client application package is configured to install the application on the Android system when executed;
    step 2: running the local service program in the background of the Android system;
    step 3: establishing binder communication between the application and the local service program, wherein during binder communication the local service program provides communication between the application and the server;
    step 4: searching for, by the local service program, the client application package according to information sent by the application;
    step 5: executing step 6 if the client application package is successfully located during the search; otherwise, breaking off the binder communication between the local service program and the application so that the application cannot communicate with the server;
    step 6: reading, by the local service program, the certification information file located in the client application package or a remote cloud server;
    step 7: certifying, by the local service program, the certification information file based on a cipher text of the certification information file; and
    step 8: normally running the application if the certification is successful; otherwise, breaking off the binder communication between the local service program and the application so that the application cannot acquire services provided by the local service program.

2. The method according to claim 1, wherein, in step 4, the local service program searches for the corresponding client application package according to a user ID and a process ID sent by the application.

3. The method according to claim 2, wherein the client application package is an APK package.

4. The method according to claim 1, wherein, in step 6, if the certification information file is not located in the client application package;
    the local service program searches for the certification information file on a remote cloud server; and
    if the certification information file is not located on the remote cloud server, the binder communication between the local service program and the application is broken off
    if the certification file is located on the remote cloud server, the certification information file is read.

5. The method according to claim 1, wherein, if the certification information file is located and the certification information file contains the cipher text and an encryption algorithm, in step 7, a corresponding certification method is selected according to the type of the encryption algorithm so as to certify the cipher text in the certification information file.

6. The method according to claim 5, wherein,
    if one-way encryption algorithm is employed, the local service program encrypts the client application package according to the encryption algorithm to generate a cipher text, and then certifies the certification information file if the generated cipher text and the cipher text in the certification information file match; and if a two-way encryption algorithm is employed, the local service program acquires a key to decrypt the cipher text in the certification information file and then certifies the certification information file according to the acquired key.

7. The method according to claim 5, wherein, if a two-way encryption algorithm is employed, a key of the two-way encryption algorithm is stored in the package in the local service program, or stored in a cloud server.

8. The method according to claim 1, wherein, in step 8, after the certification is successful, the application is run normally, and the application is allowed to call services provided by the local service program.

* * * * *